(No Model.) 4 Sheets—Sheet 1.
J. B. ARCHER.
GLASS FURNACE.
No. 427,654. Patented May 13, 1890.
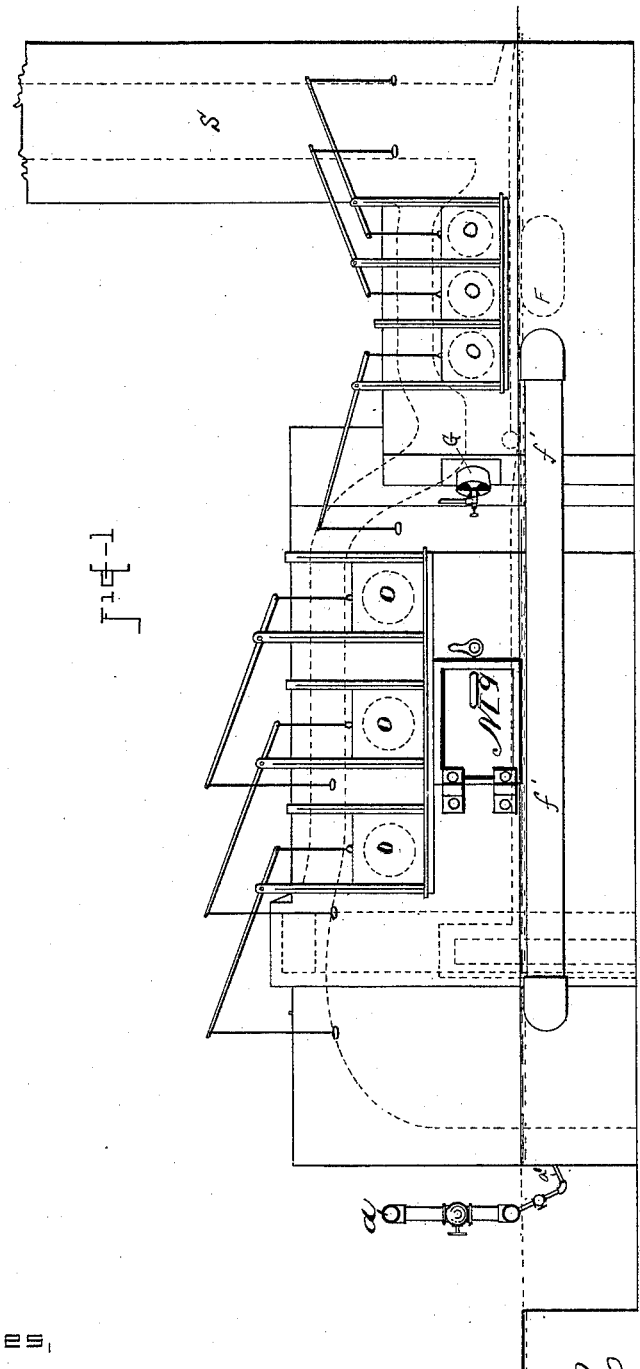

(No Model.) 4 Sheets—Sheet 2.
J. B. ARCHER.
GLASS FURNACE.
No. 427,654. Patented May 13, 1890.
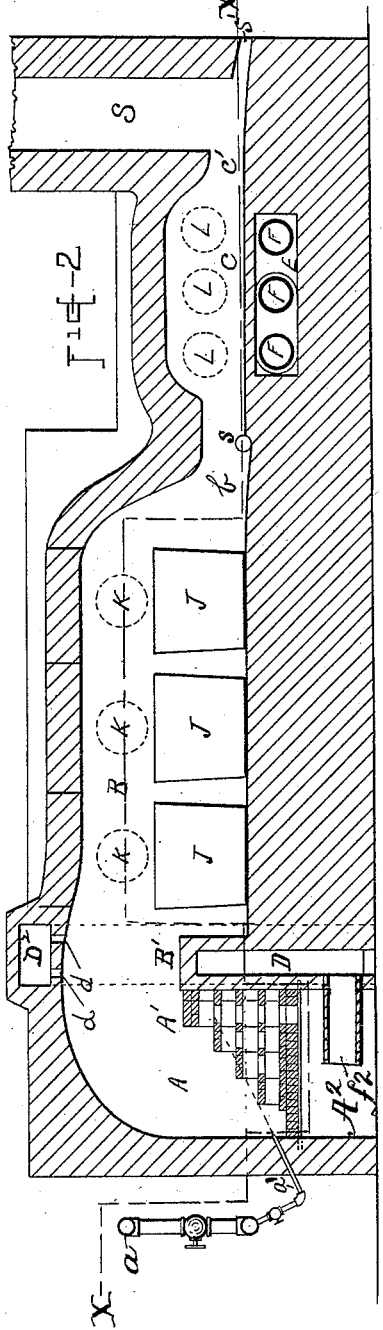
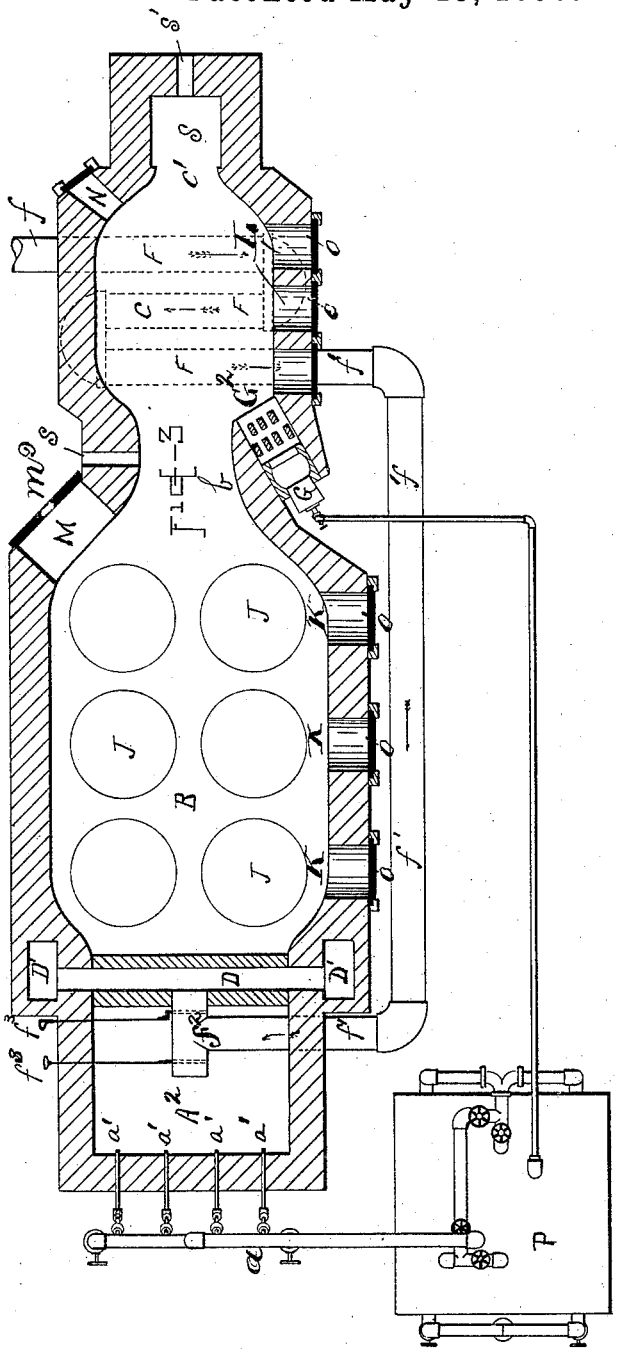
Witnesses,
Inventor
John B. Archer.
By C. S. Whitman
Attorney.

(No Model.)  4 Sheets—Sheet 3.

J. B. ARCHER.
GLASS FURNACE.

No. 427,654.  Patented May 13, 1890.

Witnesses,

Inventor
John B. Archer
By C. S. Whitman
Attorney.

(No Model.) 4 Sheets—Sheet 4.
J. B. ARCHER.
GLASS FURNACE.
No. 427,654. Patented May 13, 1890.
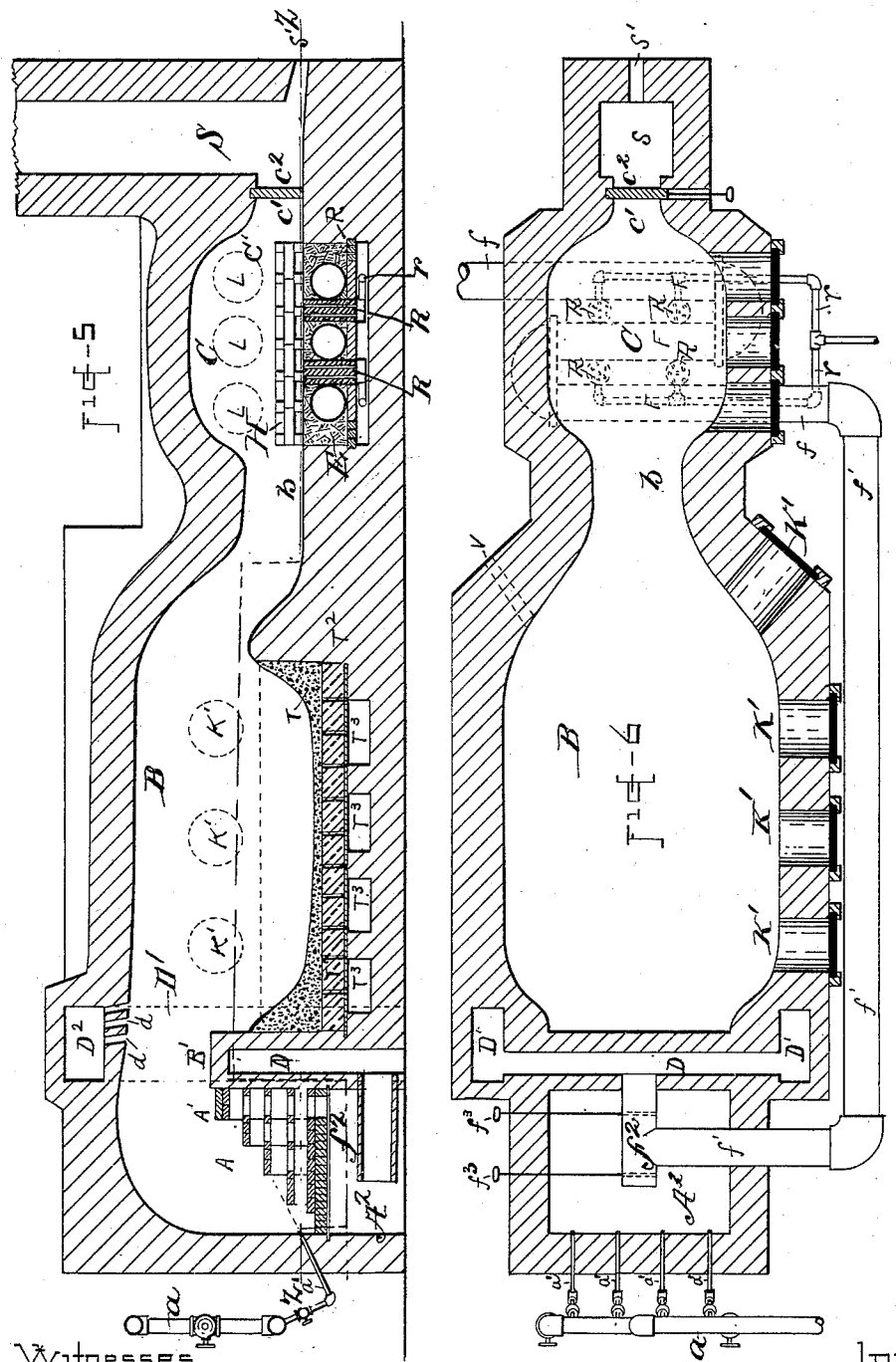
Witnesses,
Inventor
John B. Archer.
By C. S. Whitman.
Attorney.

UNITED STATES PATENT OFFICE.

JOHN B. ARCHER, OF WASHINGTON, DISTRICT OF COLUMBIA.

GLASS-FURNACE.

SPECIFICATION forming part of Letters Patent No. 427,654, dated May 13, 1890.

Application filed December 27, 1888. Serial No. 294,751. (No model.)

*To all whom it may concern:*

Be it known that I, JOHN B. ARCHER, a citizen of the United States, residing at Washington, in the District of Columbia, have invented certain new and useful Improvements in Glass-Furnaces; and I do hereby declare the following to be a full, clear, and exact description of the invention, such as will enable others skilled in the art to which it appertains to make and use the same.

My invention relates to certain new and useful improvements in furnaces, it being especially adapted for use in the manufacture of glass; and it consists in the combination of the several parts of which it is composed, as will be hereinafter more fully described and claimed.

Figure 4:
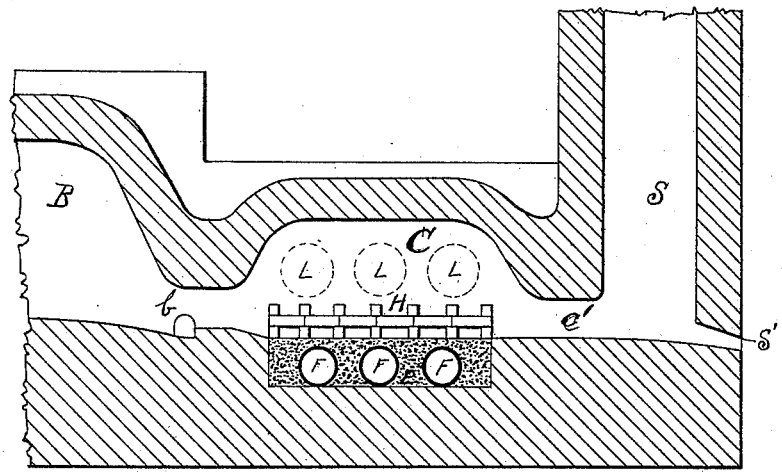
Figure 7:
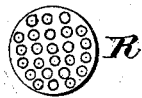
Figure 8:
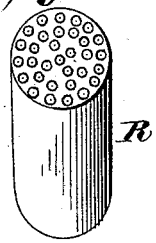

Referring to the accompanying drawings, in which corresponding parts are designated by similar letters, Figure 1 is a side elevation of a combined pot and reheating furnace. Fig. 2 is a vertical longitudinal section of the same. Fig. 3 is a horizontal section of the same on line $x\ x$ of Fig. 2. Fig. 4 is a detail vertical longitudinal section of a furnace having its reheating-chamber provided with a checker-work to act as a reservoir of heat, and having a layer or bed of sand for the reception of air-heating pipes in its bottom. Fig. 5 is a vertical longitudinal section of a combined tank and reheating furnace. Fig. 6 is a horizontal section of the same on the line $z\ z$ of Fig. 5. Fig. 7 is a detail of the perforated tiles for burning gas. Fig. 8 is a perspective view of one of the said tiles.

The pipe $a$, for supplying gas to the furnace, is connected with a gas-generating apparatus P—such as that described in my application, No. 264,822, filed on the 21st day of February, 1888, or in my application, Serial No. 280,314, filed on the 18th day of July, 1888—and is provided with jets $a'$, which open into the combustion-chamber A, which is partially filled with a checker-work A', of fire-brick or other refractory material, against which the gas impinges, mixing with heated air rising from the air-chamber $A^2$, which is situated below the combustion-chamber, through the said checker-work A'. The flame resulting from the ignition of the gas flows over the bridge-wall B' into a working or melting chamber B, which may either have a flat hearth for melting glass in pots, as shown in Figs. 2 and 3, or a hearth having a refractory lining T-shaped, in the usual manner of tank melting-furnaces, as shown in Fig. 5, or by changing the character of the chamber it may be adapted to other purposes.

In Fig. 5 of the drawings the hearth-lining T rests upon brick-work T', which in turn rests upon metallic plates $T^2$, under which are located the air-passages $T^3$ for the cooling of the bottom of the hearth. The products of combustion then pass through the neck $b$ into the reheating-chamber C, provided with blow-holes L for the introduction of the blowers' tubes, and which thus forms a glory-hole furnace, and afterward escape through the neck $c'$, which may be provided with a damper $c^2$, into the chimney S.

A recess E is formed under the reheating-chamber, through which air-pipes F F F pass from side to side, being connected in series and heated by the heat thrown off by the products of combustion in their passage through the reheating-chamber. One of the end pipes of the series opens at $f$ into the air, or may be connected with a suitable air-blower, while the other end pipe of the series is connected by the pipe $f'$ to a so-called "T-piece" $f^2$, one end of which terminates within the air-chamber $A^2$, while the other opens into the chamber D. The chamber D is formed in the bridge-wall and continues downward into the base of the furnace. In the roof of the furnace, which is curved over the combustion-chamber, is formed a chamber $D^2$, by preference located over the bridge-wall and connected with the chamber D therein by vertical flues D', built in the sides of the furnace. In the bottom of the chamber $D^2$, which is constructed of perforated tiles or bricks, is a double row of orifices $d\ d$, through which heated air which flows into the chamber $D^2$ from the chamber D escapes into the furnace and assists in the combustion of the gas.

The pipes F F F in the recess E may be covered with a layer of brick-work, as shown in Fig. 2, or they may be laid in sand and covered with sand, as shown in Fig. 4, the latter method being preferable, as the pipes are better protected and the thickness of the sand covering may be varied according to the heat that the reheating-chamber is intended to carry.

G is a supplementary burner for giving additional heat to the reheating-chamber at certain stages of the process, if required, and has an open checker-work G² in front of it to insure perfect combustion of the gas.

In Figs. 4 and 5 is shown a checker-work H, consisting of two or more tiers of loosely-piled soap-brick placed upon the floor of the reheating-chamber. When the furnace is running, these become highly heated and serve as a reservoir of heat, materially assisting in the operations of reheating by the large amount of heat they absorb and again give out by radiation.

At K K K, Fig. 3, are shown the working-openings of the melting-chamber, through which the pots are charged and the melted glass removed from the pots J J J, and at K' K' K', Figs. 5 and 6, are shown openings through which the material is introduced into the furnace, which openings, as well as the blow-holes L, are covered with counterpoised doors o o o.

M is a large door through which the pots are introduced into the furnace, and is provided with an opening $m^9$, through which the blow-tubes may be thrust into the furnace to heat them, and N is a small door inside of which may be placed a small pot of melted glass, the use of which is well known in the art and needs no description here, and a door $M^9$ may be provided, as shown in Fig. 1, to afford additional means of access to the melting-chamber.

For additionally heating the reheating-chamber cylindrical perforated tiles R R may be set in the bottom thereof between the air-heating pipes F and under the checker-work H. These tiles are supplied with gas by the pipes $r$, leading from the producer P, which gas, rising through the tiles, is ignited in the checker-work H and forms a simple and effective means for highly heating the reheating-chamber, as is desired when used for reheating bottles, &c.

The operation of the furnace is as follows: The pots are introduced into the furnace hot and remain there until they are destroyed in the case of the pot-furnace. The glass mixture having been introduced, the heat is pushed rapidly up to the desired temperature in the melting-chamber B, sufficient to melt the glass, the hot products of combustion on their way to the chimney heating the reheating-chamber C. When the contents of the furnace are entirely melted, the blowing process commences. If the reheating-chamber is not hot enough, it may be further heated by means of the burner G. The checker-work H in the bottom of the chamber acts as a reservoir of heat, and by its great radiation materially assists in this process. The air flowing through the pipes F F F is heated by the products of combustion and then flows through the pipe $f'$ and T-piece $f^2$ into the chambers $A^2$ and $D^2$, the amount of air admitted to each chamber being capable of control by means of dampers $f^3 f^3$. The air admitted to the chamber $A^2$ rises through the checker-work $A'$ into the combustion-chamber A, where it enters into combustion with gas issuing from the jets $a'$, the resultant flame passing over the bridge-wall B', where it unites with the air flowing through the holes $d$, which has been still more highly heated by passing the bridge-wall, thus increasing the heat of combustion. Any glass that may be spilled and the slag formed by the running of the pots and bottom are drawn off by the slag-holes $s$ and $s'$, while V is a slag-hole by which the bottom of the hearth of the tank-furnace may be cleaned, when desired.

Having now described my invention, what I claim, and desire to secure by Letters Patent, is—

1. In a furnace, the combination of a combustion-chamber, a chamber in which the material to be heated is placed, pipes placed in the base thereof and connected with the combustion-chamber, and a layer of sand over the said pipes, whereby the thickness of their covering may be changed at will.

2. In a furnace, the combination of a combustion-chamber, a chamber in which the material to be treated is placed, a bridge-wall located between the two, air-chambers located in the roof of the furnace and in the bridge-wall communicating with the interior of the furnace, a pipe situated at the base of the interior of the furnace connected with the base of the said combustion-chamber and with the air-chambers, and a layer of sand over the said pipe, whereby the thickness of its covering may be varied at will, as and for the purposes described.

3. In a furnace, the combination of a combustion-chamber, a checker-work therein, gas-burners projecting into the said chamber, a chamber in which the material to be treated is placed, a bridge-wall located between the said combustion-chamber and the chamber in which the material to be treated is placed, air-chambers located in the roof of the furnace and in the bridge-wall communicating with the interior of the furnace, a pipe situated at the base of the interior of the furnace connected with the base of the said combustion-chamber and with the air-chambers, a layer of sand over the said pipe, whereby the thickness of its covering may be varied at will, and supplemental burners consisting of perforated tiles in the interior of the furnace between the said pipes, and gas-supply pipes connected with the said burners.

4. In a glass-furnace, the combination of a combustion-chamber, a chimney, a glass-melting chamber and a reheating-chamber situated between the combustion-chamber and the chimney, and a checker-work in the said reheating-chamber for storing up heat, as and for the purposes described.

In testimony whereof I have hereunto set my hand in presence of two witnesses.

JOHN B. ARCHER.

Witnesses:
L. B. MARTIN,
VERNON M. DORSEY.